March 1, 1960 H. A. MAGNUS ET AL 2,926,638
THRUSTER WITH BY-PASS
Filed June 26, 1957

INVENTORS,
HERBERT A. MAGNUS
ALBERT M. STOTT
BY
W. E. Thibodeau, T. J. Lynch & H. R. Johns

United States Patent Office 2,926,638
Patented Mar. 1, 1960

2,926,638

THRUSTER WITH BY-PASS

Herbert A. Magnus, Branford, Conn., and Albert M. Stott, Clifton Heights, Pa., assignors to the United States of America as represented by the Secretary of the Army Application June 26, 1957, Serial No. 668,262

4 Claims. (Cl. 123—24)

(Granted under Title 35, U.S. Code (1952), sec. 266)

The invention described herein may be manufactured and used by or for the Government for governmental purposes without the payment of any royalty thereon.

This invention relates to thrusters of the gas operated type, and has for its principal object the provision of an improved thruster which operates to exert a relatively strong initial thrusting force and to exert a relatively weak final thrusting force.

This improved thruster provides a proper timing sequence and a force great enough for the unlocking of an aeroplane canopy and the firing of the canopy removed. Thus the high initial thrust makes for easy unlocking of the canopy under high resistance loads. The lower thrust, which occurs after the stripping of a two-part piston, makes it easier to stop the masses of the moving parts when the resistance loads are normally low. As will appear the stripping of the two-part piston also affords an opening through which the gases proceed to a by-pass.

The invention will be better understood from the following description considered in connection with the accompanying drawings and its scope is indicated by the appended claims.

Referring to the drawings.

Figure 1:
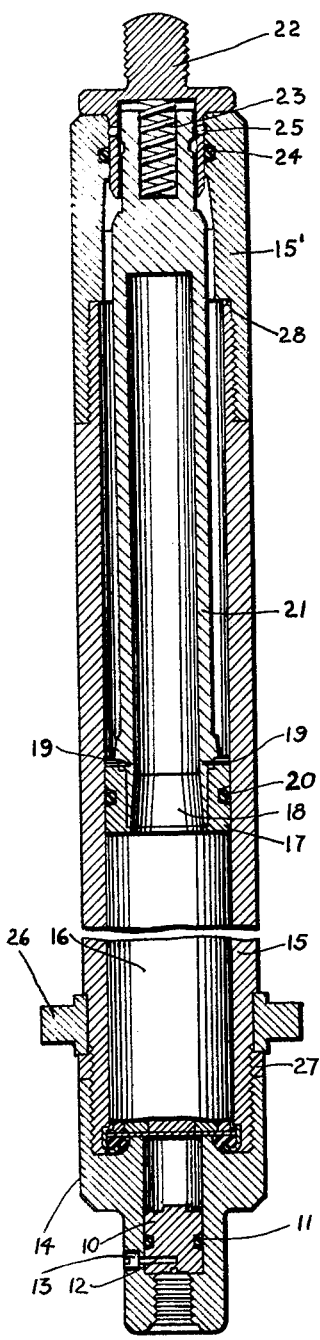
Fig. 1 is a sectional view of the thruster of the present invention.

Fig. 1 shows a firing pin 10 which is provided with a sealing ring 11 and is fixed to an end cap 14 by a shear pin 12 and a screw 13.

The end cap 14 is fixed to a cylinder 15 within which is mounted an explosive cartridge 16 and a piston consisting of parts 17 and 18. These parts are fixed together by shear pins 19 and the part 17 is provided with a sealing ring 20.

A rod 21 extends between the piston part 18 and an end sleeve 22, a spring 23 being interposed between this sleeve and the rod 21. A sealing ring 24 is interposed between the inner wall of an end cap 15' and the sleeve 22.

In assembling the thruster, the end sleeve 22 is screwed on to the end of the piston rod 21 until the threads of the sleeve 22 have passed those of the piston rod 21. After that, these threads serve merely as a stop so that the sleeve is not lost.

Figure 3:
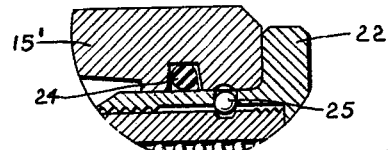
Fig. 3 illustrates means for locking the piston of Fig. 1 to the casing in which it moves, and Figs. 4 and 4A indicate how the gas escapes from the thruster of Fig. 1.

In the illustrated standby condition of the thruster, the sleeve 22 is locked to the end cap 15' by balls 25 which are arranged to rest in a groove on the inner surface of the end cap 15. When the rod 21 is forced to the right, however, the spring 23 is compressed and the balls 25 pass into a groove on the outer periphery of the rod 21 so that the sleeve is now free to move, as indicated in Fig. 3.

Figure 2:
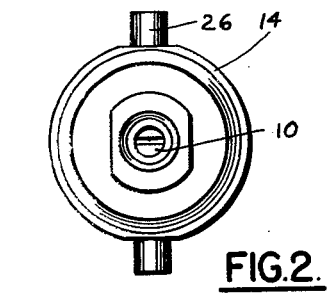
Fig. 2 is an end view taken at the left of Fig. 1.

As indicated in Figs. 1 and 2, the thruster may be provided with a trunnion ring 26 and a take-up ring 27 which is interposed between the end cap 14 and the trunnion ring.

In the operation of the thruster, gas under pressure is applied to the firing pin 10, shearing the pin 12 and driving the pin against the primer of the cartridge 16. The gas generated by the resulting explosion drives the piston to the right. This movement compresses the spring 23 until the balls 25 drop into the slot on the outer periphery of the rod 21, thus unlocking the sleeve 22 from the end cap 15' and locking it to the piston rod 21 momentarily. Under these conditions, the piston is free to continue its travel until the part 17 strikes a face 28, the ring 24 acting as a seal between the rod 21 and the end cap 15' of the enclosure 15. This terminates the period during which a relatively strong thrusting force is exerted by the thruster.

When the part 17 strikes the face 28, the pins 19 are sheared and the part 18 continues to travel until it is wedged against a tapered inner surface 30 of the end cap 15'. This wedging effect prevents any rebound and terminates the period during which a relatively weak thrusting force is exerted by the thruster.

Figure 4:
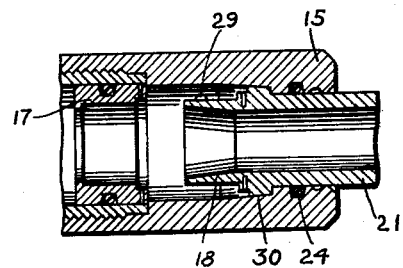
Figure 4A:
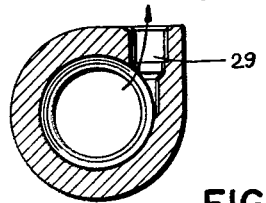

When the parts 17 and 18 are separated as explained above, the gas escapes from the thruster by way of the part 17 and an inlet 29 (see Fig. 4A) as indicated by the arrow of Fig. 4.

We claim:

1. In a thruster, the combination of a cylinder, a cap threaded onto one end of said cylinder to form an internal shoulder and having a central opening with an internal peripheral groove and an outwardly sloping area, means forming a gas generating chamber at the other end of said cylinder, a piston having a first part formed to engage said shoulder and a second part formed to engage said sloping area, a severable connection between said parts, a rod fixed at one end to the second of said parts and having at its other end an external peripheral groove displaced inwardly of said cylinder with respect to said internal peripheral groove in the inextended position of said piston, a sleeve carrying a ball extendable into said internal peripheral groove for locking said sleeve to said cap and extendable into said exterior peripheral groove for releasing said sleeve from said cap, and means biasing said rod away from said sleeve.

2. A thruster according to claim 1 wherein said biasing means is a spring mounted in a recess in the end of said rod.

3. A thruster according to claim 1 wherein the rupture of said severable connection and the separation of said parts completes a passageway from the interior to the exterior of said cylinder.

4. A thruster according to claim 1 wherein the movement of said sleeve with respect to said rod is limited by an internal thread at the inner end of said sleeve and an external thread at the outer end of said rod.

References Cited in the file of this patent

UNITED STATES PATENTS

| | | |
|---|---|---|
| 2,146,185 | Holek | Feb. 7, 1939 |
| 2,497,084 | Irby | Feb. 14, 1950 |
| 2,499,227 | Miles | Feb. 28, 1950 |
| 2,575,071 | Rockwell | Nov. 13, 1951 |
| 2,582,989 | Harvey | Jan. 22, 1952 |
| 2,794,396 | Smith | June 4, 1957 |
| 2,815,008 | Hirt | Dec. 3, 1957 |
| 2,837,370 | Stott et al. | June 3, 1958 |

OTHER REFERENCES

Aviation Week, vol. 65, No. 20, page 71, Nov. 12, 1956.